United States Patent [19]

Peludat

[11] Patent Number: 4,730,551
[45] Date of Patent: Mar. 15, 1988

[54] HEAT DISTRIBUTOR FOR SUSPENDED CEILINGS

[76] Inventor: Walter W. Peludat, 2218 E. Wattles Rd., Troy, Mich.

[21] Appl. No.: 926,419

[22] Filed: Nov. 3, 1986

[51] Int. Cl.$^4$ .............................................. F24F 1/01
[52] U.S. Cl. .................................... 98/315; 98/40.28; 98/121.1
[58] Field of Search ............... 98/31.5, 40.28, 40.2, 98/121.1, 114; 55/385 A

[56] References Cited

U.S. PATENT DOCUMENTS

| | | | |
|---|---|---|---|
| 2,077,734 | 4/1937 | Anderson | 98/121.1 |
| 3,320,406 | 5/1967 | Wainwright | 165/122 |
| 3,347,025 | 10/1967 | Wiley | 98/31.5 |
| 3,827,342 | 8/1974 | Hughes | 98/31.5 |
| 4,512,242 | 4/1985 | Bohanon | 98/31.5 |
| 4,549,472 | 10/1985 | Endo et al. | 98/31.5 |
| 4,560,395 | 12/1985 | Davis | 55/385 A |
| 4,658,707 | 4/1987 | Hawkins et al. | 98/2.11 |

FOREIGN PATENT DOCUMENTS 163195 10/1982 Japan ..................................... 91/31.5

Primary Examiner—Albert J. Makay
Assistant Examiner—David W. Westphal
Attorney, Agent, or Firm—Gifford, Groh, VanOphem, Sheridan, Sprinkle and Dolgorukov

[57] ABSTRACT

A heat distributor for equalizing the temperature gradient of a room. A housing is supported on a gridwork of a suspended ceiling. Warm air from near the ceiling is drawn through a perforated panel and an air filter mounted in the housing. An electric fan directs the warm air downwardly through a baffle having a conical flange to form a column of warm air which is directed to the floor. A rotatable, perforated disk has wedge shaped walls to compress the air and direct the column of air to a targeted area below. A source of ultraviolet radiation is installed in the housing to sterilize the warm air.

15 Claims, 6 Drawing Figures

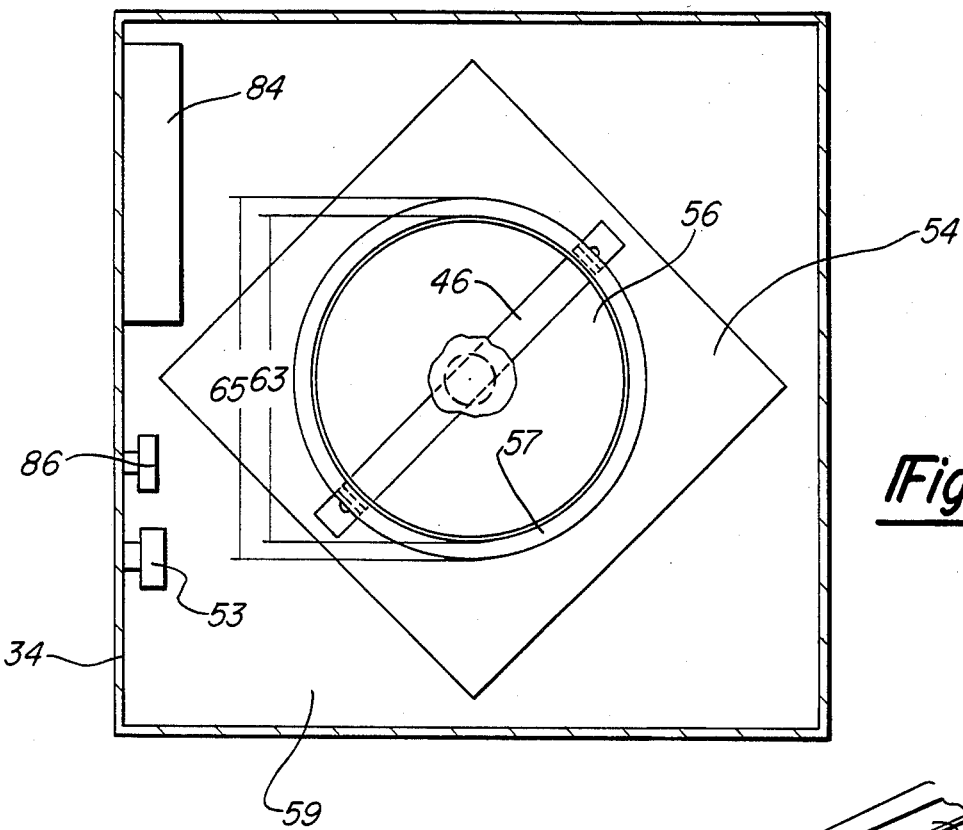
*Fig-4*
*Fig-5*
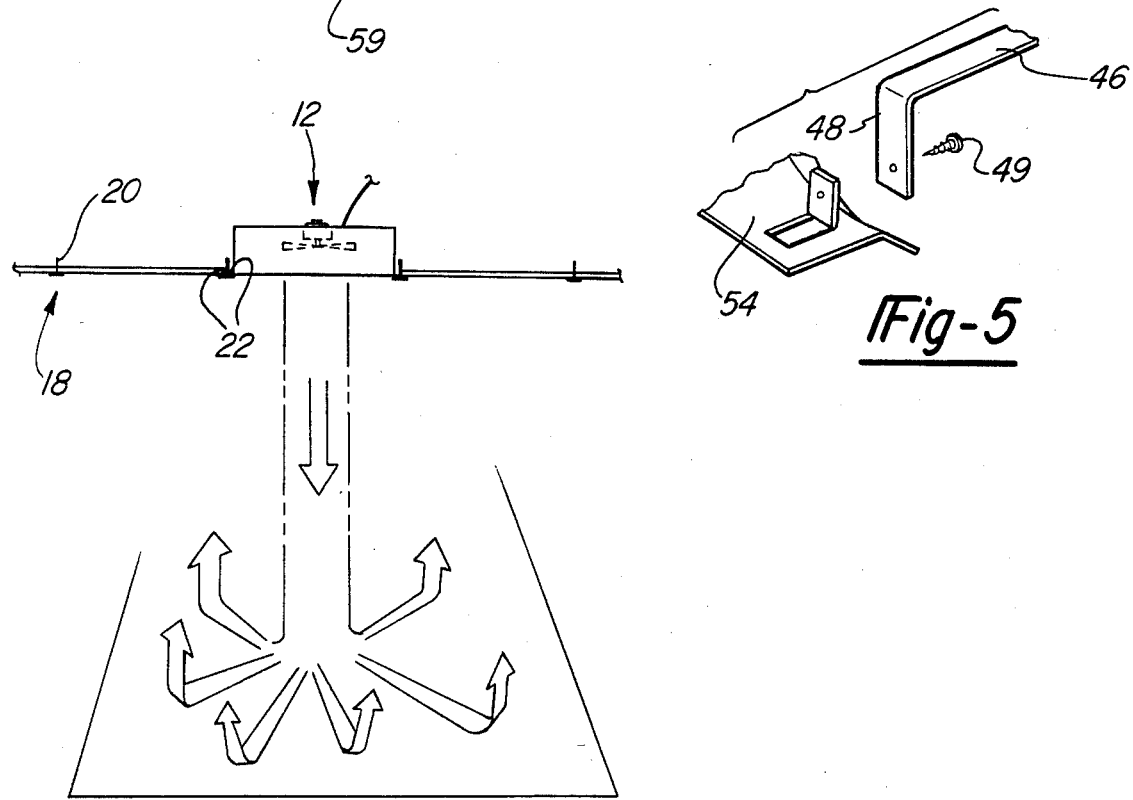
*Fig-6*

HEAT DISTRIBUTOR FOR SUSPENDED CEILINGS

BACKGROUND OF THE INVENTION

I. Field of the Invention

The present invention relates generally to an apparatus for distributing heated air throughout a room in a building more particularly to a device adapted to be mounted in a frame of a suspended ceiling.

II. Description of the Prior Art

Stratification of air masses frequently occurs in the rooms of a building. Typically, masses of hot air are trapped beneath the ceiling in an upper portion of a room while cooler air masses occupy a lower portion of the room. In order to improve the efficiency of the heating system of the building, it is advantageous to direct the hot air masses from the top of the room to the lower portion of the room in order to equalize the heat gradient throughout the room. In buildings which have high ceilings, a considerable amount of heated air must be introduced into lower portions of the room to replace the heated air which has risen in order to maintain a given temperature in the lower portion of the room.

It is known in the art to suspend a fan downwardly from the ceiling of a room to direct warm air from the ceiling towards the floor of the room. However, the air so directed diffuses rapidly as it moves downwardly from the blades of the ceiling fan and travels downwardly only a short distance. Additionally, such fans occupy space within the room, are unattractive, and produce a substantial amount of noise.

Air circulating devices are also known in the art, such as U.S. Pat. No. 3,827,342 to Hughes. Hughes utilizes a tubular, elongated housing extending vertically between a floor and a ceiling of a room. A fan is mounted within the housing to draw air through an intake located at a base of the housing and discharges it through the top of the housing near the ceiling. This device, however, occupies a substantial amount of space within the room and is exposed to view.

A combination heating and ventilation unit which may be mounted in a ceiling or wall of a room disclosed in U.S. Pat. No. 3,320,406 to Wainwright is also known. Wainwright discloses a combination heating and ventilating unit which utilizes a fan mounted within a housing to direct air for a heating coil outwardly into the room. However, the heating coil requires additional energy and the heated air diffuses rapidly throughout the room after the heated air leaves the heating and ventilating unit.

SUMMARY OF THE PRESENT INVENTION

The present invention overcomes the above-mentioned disadvantages by providing a heat distributor secured to a grid of a suspended ceiling support frame which directs a column of warm air drawn from the upper portion of a room downwardly to the floor. The heat distributor has a housing formed for suspension on the grid of the ceiling support frame. The housing forms a chamber having an open bottom portion. A perforated panel is mounted in the housing spanning the open bottom portion. A filter is mounted in the chamber above the perforated panel. An electric fan is mounted in the chamber to draw warm air from the room through the perforated panel and filter and around the edges of a baffle into the chamber. The fan directs the warm air downwardly through an orifice centrally disposed in the baffle through the filter and perforated panel into the room. The orifice is formed through a conical flange, so that the warm air directed through the orifice by the fan is formed into a compact column. The column is further compressed as it is directed through passages which are narrowed by a grid having wedge shaped walls in a grid of a disk mounted in the perforated panel. The wedge shaped walls may be angled within the grid to direct the column of warm air at an angle offset from a vertical plane. The column of warm air may be directed into targeted areas of the room by rotating the grid disk in the perforated panel. The heated air is subjected to radiation from a source of ultraviolet radiation which is mounted in the chamber to minimize bacteria within the circulated air.

It is therefore an object of this invention to provide a heat distributor which is adapted to be installed in a suspended ceiling.

The further object of this invention is to provide a heat distributor which draws warm air from the upper portion of the room and directs the column of heated air to a lower portion of the room.

It is another object of the invention to provide a heat distributor which removes particulate matter from the air.

It is yet another object of the invention to improve the efficiency of a heating system by directing air downwardly in a column which may be directed to designated areas of the room.

It is an additional object of the invention to remove bacteria from the heated air by the use of ultravoilet radiation.

Additional obvious features of the invention will become apparent from the following detailed description taken together with the accompanying drawings.

DESCRIPTION OF THE DRAWING

With the accompanying drawing in which like reference characters refer to like parts throughout the several views, and in which:

FIG. 4 is a sectional bottom view of the device taken along line 4—4 of FIG. 3;

FIG. 5 is a fragmentary perspective view of a portion of the baffle and U-shaped bracket of the preferred embodiment;

FIG. 6 is a diagramic view of the device showing the path of the column of air through the room and along the floor of the room.

DETAILED DESCRIPTION OF A PREFERRED EMBODIMENT OF THE PRESENT INVENTION

Figure 1:
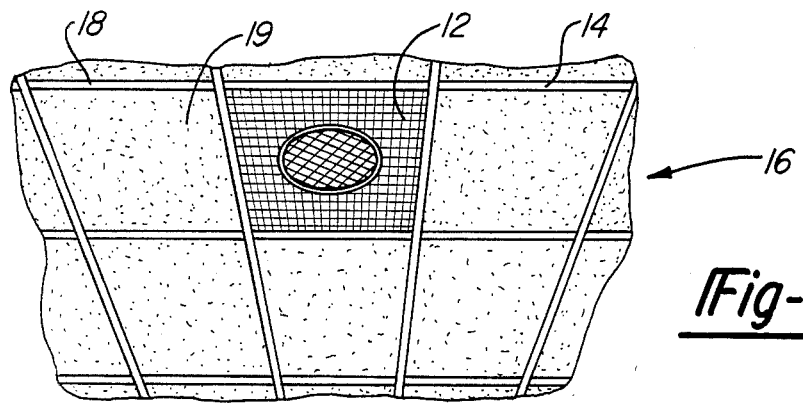
FIG. 1 is a perspective view of the heat distributor according to the present invention installed in a suspended ceiling.

Referring to FIG. 1, a heat distributing device in accordance with the present invention is shown having an assembly 12 suspended by a frame structure 14 of a suspended ceiling 16. The frame structure 14 has a plurality of cross braces 18 formed to support ceiling tiles 19. As best shown in FIG. 4, each of the plurality of cross braces 18 has a vertically extending center leg 20. The center leg 20 extends upwardly from the center of the crosspiece to form a pair of ledges 22 extending on either side of the center leg 20. Thus, the assembly 12 is supported in the same manner as the ceiling tiles 19 on the ledges 22 of the cross braces 18. Accordingly, the center legs 20 of adjacent frame members are spaced apart having substantially the same width of a ceiling tile as is known in the art.

Figure 2:
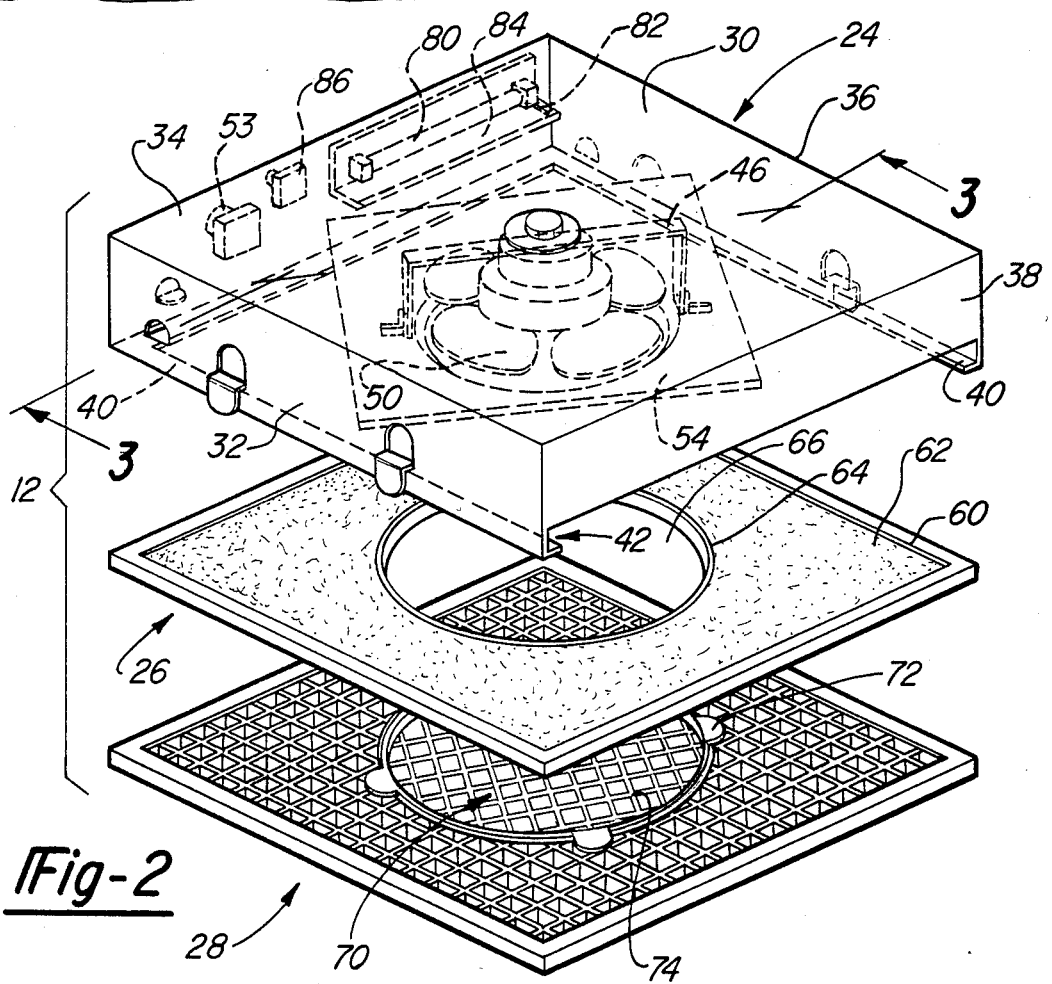
FIG. 2 is an exploded perspective view of the device as shown in FIG. 1.

As best shown in FIG. 2, the heat distributor assembly 12 includes a housing 24, a filter 26, and a perforated panel 28.

The housing 24 is generally rectangular in shape having a top portion 30 and four side walls 32, 34, 36, and 38 extending downwardly from the top portion to form an inverted box with an open bottom. The housing 24 may be formed of any suitable, rigid material such as metal, or plastic and is formed to produce a rigid shape having sufficient strength to support the various elements. Along a lower edge of each of the side walls 32, 34 and 36 is a lip 40 extending inwardly normal to the respective side walls 32, 34, and 36. Each lip 40 is, thus, formed to rest upon the ledge 22 of the cross braces 18 to support the housing 24 in the suspended ceiling 16 as best shown in FIG. 6. The side wall 38 extends a lesser distance from the top portion to provide a gap 42 that occurs along a lower edge of side wall 38 as shown in FIG. 2. As will be set forth more fully below, the gap 42 is provided to accept the filter element 26 and ceiling panel 28 which are inserted through the gap 42 and rest upon the upper side of the lip 40.

Tabs 44 are formed on the opposing walls 32 and 36. The tabs are bent outwardly and downwardly from the side walls to form an L-shaped projection and are positioned to receive the vertical center leg 20 of the cross braces 18 between the side wall and tabs so that the housing is securly positioned upon the suspended ceiling 16.

Figure 3:
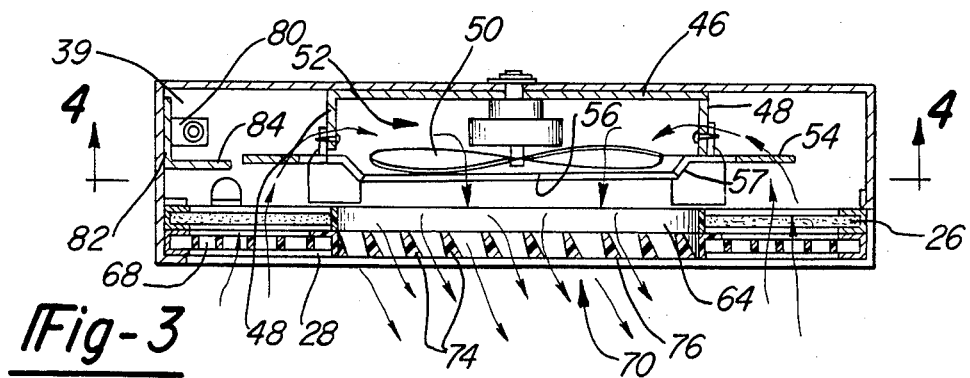
FIG. 3 is a sectional side view of the device taken along lines 3—3 of FIG. 2.

As best shown in FIG. 3, a U-shaped bracket 46 is fixed in any conventional manner to the top portion 30 of the housing to extend downwardly into the chamber of the housing 24. The U-shaped bracket 46 has a pair of arms 48 extending downwardly and spaced apart to support a baffle 54 as is set forth below more fully below.

Mounted to the housing 24 between the pair of arms 48 of the shaped bracket is an electric fan 52. The electric fan 52 is fixably mounted within the arms of the U-shaped bracket 46 and the housing 24 by any appropriate means such as bolts or rivets. The fan 52 is mounted so that blades 50 of the fan 52 are directed downwardly away from the top portion 30 of the housing 24. As is shown in FIGS. 2 and 4, a rheostat 53 for controlling the speed of the fan 52 is mounted on the side wall 34. The rheostat 53 may be located remotely from the heat distributor assembly 12 such as in a wall of the room. The rheostat 53 may be used to control the speed of the electric motor and thereby control the volume of air directed downwardly by the fan 52.

Tabs 55 are formed to extend upwardly from the baffle 54 and are affixed by appropriate means such as rivets or screws 49 to the lower ends of the pair of arms 48 of the U-shaped bracket 46 as shown in FIG. 5. Thus, the baffle 54 is supported in the chamber of the housing beneath the electric fan 52. The baffle 54 is generally rectangular in shape and is rigidly formed of sheet metal or plastic, as shown in FIG. 4. An orifice 56 is centrally formed in the baffle 54 having a diameter slightly larger than the span of the fan blades 50. A flange 57 having the shape of a truncated cone, extends downwardly from the baffle 54. The truncated cone has a lower diameter 63 smaller than an upper diameter 65 of the cone. The air flow formed by the fan 52 is directed through the orifice 56 and flange 57 to form a compressed column of air. Because the lower diameter 63 of the cone is smaller than the upper diameter 65 of the of the cone the velocity of the flow of air exiting the bottom of the baffle 54 is increased.

The baffle 54 extends partially across the chamber of the housing 24. An inlet passage 59 is formed between the side walls 32, 34, 36 and 38 and an outer edge of the baffle 54. As shown in FIG. 3, warm air from the room near the ceiling is drawn into the chamber upwardly through the inlet passages 59 by the fan 52 and then directed downwardly through the orifice 56 and flange 57 of the baffle.

Resting on the lips 40 beneath the flange 57 are the filter 26 and the perforated panel 28 as shown in FIG. 3. The filter 26 rests upon the perforated panel 28. The filter 26 has a rectangular frame 60 having sides dimensioned to conform with the interior dimensions of the housing 24. The rectangular frame 60 supports a filter element 62 as shown in FIG. 2. The filter element 62 may be any suitable material for purifying air, such as mats of woven microcarbon, and fiberglass material. Microcarbon fiberglass filters are particularly well suited to air purification. The filter element 62 filters the warm air which is drawn into the chamber prior to passage through the inlet passage 59. A plastic ring 64 is centrally disposed in the filter element 62 to form an aperture 66 in the filter element 62 beneath the flange 57, thus, the column of air exiting the flange 57 passes through the filter element 62 unhindered. The filter 26 may be replaced or cleaned by sliding it outwardly from the chamber through the gap 42.

Resting on the lips 40 of each of the side walls 32, 34, 36 and 38 is the perforated panel 28 as shown in FIG. 3. The perforated panel 28 is formed of a lattice structure having a plurality of rectangular passages 68 passing vertically through the perforated panel 28 to permit a flow of air to pass through. The perforated panel 28 may be formed of any suitable material such as plastic or fiberglass and is generally colored so as to match the color of the ceiling.

A movable disk 70 is centrally positioned in an opening in the perforated panel 28 beneath the aperture 66 of the filter. The movable disk 70 is supported for movement in the opening by ears 72 which extend from an outer circumferential edge of the disk 70 as shown in FIG. 2. The ears 72 extend beyond the opening in the perforated panel 58 above a top surface of the perforated panel 28. The disk 70 is formed of the same material as the ceiling panel and has a similar lattice structure. However, the walls 74 of the lattice structure of the disk 70 have a triangular or wedge shaped cross section with a thicker portion 76 located at the bototm of the disk 70 such that the passages are narrowed as the column of air passes from the fan blades to the room below. In the preferred embodiment, the walls 74 of the disk 70 are offset from vertical such that the axis of column of air is directed from vertical approximately 10–20 degrees as the column exits the disk 70 as shown in FIG. 3. The column is offset so that it may be directed to a specific area of the floor below. Rotating the disk 70 in the perforated panel 28 thereby directs the column of warm air to a targeted area on the floor. The air column, thus produced, is directed downwardly with such force that it forms a column of air which has a low rate of diffusion and maintains a compact cross section as it travels downwardly to contact the floor below.

An ultraviolet light 80 and a shield 82 are mounted to side wall 34 in the chamber 39 as shown in FIG. 3. The ultraviolet light 80 and the shield 82 are fixed to the side wall 34 in a suitable manner. The ultraviolet light 80 is mounted to expose radiation to the air drawn into the chamber 39 above the baffle. As is known, ultraviolet radiation is useful in sterilizing or freeing the air from bacterial matter. Thus, the air drawn into the chamber 39 from the room below is subjected to ultraviolet radiation and sterilized before being directed back downwardly into the room by the fan 52.

The shield 82 is L-shaped with a lower portion 84 extending beneath the ultraviolet light 80 in order to prevent radiation from passing downwardly into the room area below. The shield 82 may be formed of any material suitable for deflecting the radiation. A switch 86 for energizing the ultraviolet light 80 is mounted to the side wall 34. The switch 86 may be mounted remotely, for example, in the wall of the room, in order to activate the ultraviolet light 80.

Operation

Upon energization of the electric fan 52, warm air from the upper portion of the room is drawn through the passages in the perforated panel 28, through the filter element 62 as shown in FIG. 3. As the warm air is drawn through the filter element 62, airborn particulate matter is filtered and removed from the air. The warm air is drawn through the inlet passage 59 into the chamber where the air flow is subjected to radiation from the ultraviolet light 80 thereby freeing the air from bacteria.

The air flow is then directed downwardly by the fan blades 50 through the flange 57 of the baffle 54 to form a column of warm air indicated by the arrow in FIG. 6. As the air flow passes through the flange 57, the flow is constricted thereby increasing the velocity of the column. The column then passes through the disk of the perforated panel 28. The column of warm air is, then, further constricted and directed downwardly to a targeted area of the floor. As shown in FIG. 6, the air is directed in a compact column to the floor, the air then is directed outwardly along the floor. The air travels outwardly along the floor until it is directed upwardly by walls, partitions, or until the heated air rises thereby delivering warmer air from the upper portion of the room to the lower portion of the room. The delivery of the warm air to the lower part of the room provides a more even heat gradient over the vertical span of the room, thereby, efficiently distributing the heat and requiring a lesser amount of heat to maintain a given temperature in the lower portion of the room.

What I claim is:

1. A heat distributor for a room having a suspended ceiling comprising:
    a housing having an upper portion defining a chamber and a lower portion having an aperture, said housing adapted for mounting in said suspended ceiling;
    a perforated member mounted to said housing, said perforated member spanning said aperture of said housing; said perforated member having at least one inlet opening and an outlet opening;
    a filter member mounted to said housing in said chamber above said perforated member;
    a baffle member mounted in said chamber, said baffle member and said upper portion of said housing defining an inlet passage therebetween for flow communication with said at least one inlet opening of said perforated member, said baffle further having a circular flange portion defining an orifice, said orifice positioned for flow communication with said outlet portion;
    means for drawing warm air from an upper portion of said room through said at least one inlet opening of said perforated member into said chamber and directing said warm air downwardly through said orifice of said baffle and said outlet portion of said perforated member to form a column of warm air; and
    a lattice member mounted in said inlet opening, said lattice member having a top surface, a bottom surface, and a plurality of wedge portions extending therebetween defining a plurality of passages each of, said plurality of passages being narrower at said bottom surface than at said top surface of said lattice structure such that the velocity of the said column of air is further increased as said column of air passes through said plurality of passages.

2. The heat distributor as claimed in claim 1 where in said circular flange portion of said baffle has a predetermined upper diameter and a predetermined lower diameter, said upper diameter being greater than said lower diameter such that the velocity of said column of air is increased.

3. The heat distributor as claimed in claim 2 wherein said lattice structure comprises a disk member rotatably mounted in said perforated member.

4. The heat distributor of claim 3 wherein said disk member has an outer diameter generally equal to said lower diameter of said circular flange, each of said plurality of passages having a first predetermined axis offset a predetermined angle from vertical such that said plurality of passages direct said column of air along longitudinal axis offset at an angle from vertical generally equal to said predetermined angle to direct said column of warm air to a desired location.

5. The heat distributor as claimed in claim 1 wherein said means for drawing air comprises:
    an electric fan, said fan being mounted to said housing in said chamber.

6. The heat distributor as claimed in claim 5 comprising:
    means for controlling the speed of said fan, said means for controlling mounted to said upper portion of said housing.

7. The heat distributor as claimed in claim 1 wherein said at least one inlet aperture of said perforated member comprises a plurality of openings formed in a grid structure.

8. The heat distributor as claimed in claim 1 further comprising:
    means for generating ultraviolet radiation to sterilize air drawn into said chamber from said room, said means for generating ultraviolet radiation mounted to said upper portion of said housing within said chamber; and
    a shield member mounted to said upper portion of said housing beneath said means for generating ultraviolet radiation to block said ultraviolet radiation from entering said room.

9. The heat distributor as claimed in claim 1 wherein said perforated member has the dimensions of a conventional ceiling panel.

10. The heat distributor as claimed in claim 9 comprising:
   means for mounting said outer housing to said suspended ceiling, said means for mounting positioned on said side portion of said housing.

11. The heat distributor as claimed in claim 1 wherein said upper portion of said housing further comprises:
   a top portion and a side portion extending downwardly from said top portion to form said chamber.

12. A heat distributor for a room having a suspended ceiling comprising:
   a housing having an upper portion defining a chamber, said housing adapted for mounting in said suspended ceiling;
   a perforated member mounted to said housing, said perforated member having a plurality of holes;
   a baffle member mounted in said chamber, said baffle further having a circular flange portion defining an orifice, said orifice positioned for flow communication with said perforated member;
   means for drawing warm air from said room through said perforated member and directing said warm air downwardly through said orifice of said baffle and said perforated member to form a column of air directed to the floor of said room;
   a disk member rotatably mounted in said perforated member, said disk member having a lattice structure having plurality of passages, each of said plurality of passages having a first predetermined axis offset a predetermined angle from vertical so that said plurality of passages direct said column of air along a second predetermined axis offset at an angle from vertical generally equal to said predetermined angle of said first predetermined axis of each of said plurality of passages to a desired location; said disk member rotatably to direct said column of air to a desired location; and
   means for generating ultraviolet radiation to sterilize air drawn into said chamber from said room, said means for generating ultraviolet radiation mounted to said housing within said chamber.

13. The heat distributor as claimed in claim 12 wherein said circular flange portion of said baffle has a predetermined upper diameter and a predetermined lower diameter, said upper diameter being greater than said lower diameter such that the velocity of said column of air is increased.

14. The heat distributor as claimed in claim 12 wherein said means for drawing air comprises:
   an electric fan, said fan being mounted to said housing in said chamber.

15. The heat distributor as claimed in claim 12 wherein said disk member comprises:
   a top surface, a bottom surface, and a plurality of wedge portions extending therebetween, said wedge portions being wider at said bottom surface than at said top surface of said lattice structure such that the velocity of the said column of air is further increased as said column of air passes through said plurality of passages.

* * * * *